(12) United States Patent
Mizumoto et al.

(10) Patent No.: US 8,294,065 B2
(45) Date of Patent: Oct. 23, 2012

(54) STAINLESS STEEL WIRE WITH FLUX CORE FOR WELDING ZINC COATED STEEL SHEETS

(75) Inventors: Manabu Mizumoto, Chiba (JP); Shinji Kodama, Tokyo (JP); Kenichi Asai, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 964 days.

(21) Appl. No.: 12/307,339

(22) PCT Filed: Jul. 4, 2007

(86) PCT No.: PCT/JP2007/063763
§ 371 (c)(1),
(2), (4) Date: Jan. 2, 2009

(87) PCT Pub. No.: WO2008/004699
PCT Pub. Date: Jan. 10, 2008

(65) Prior Publication Data
US 2009/0314760 A1 Dec. 24, 2009

(30) Foreign Application Priority Data

Jul. 5, 2006 (JP) .................... 2006-185171
Jun. 29, 2007 (JP) .................... 2007-172124

(51) Int. Cl.
*B23K 35/02* (2006.01)
(52) U.S. Cl. .......... 219/145.22; 219/146.23; 219/146.24
(58) Field of Classification Search ............. 219/145.22, 219/146.23, 146.24, 146.1, 145.1
See application file for complete search history.

(56) References Cited

U.S. PATENT DOCUMENTS

| 3,848,109 A * | 11/1974 | Zvanut ................. 219/146.41 |
| 6,339,209 B1 * | 1/2002 | Kotecki ................. 219/146.23 |
| 7,829,820 B2 * | 11/2010 | Karogal et al. ......... 219/145.22 |
| 2006/0081579 A1 * | 4/2006 | Kotecki ................. 219/145.22 |

FOREIGN PATENT DOCUMENTS

| CN | 85 1 07951 A | 7/1987 |
| DE | 2644039 B1 | 1/1978 |
| EP | 0590623 A1 | 4/1994 |
| EP | 0867256 A1 | 9/1998 |
| JP | 2000-064061 A | 2/2000 |
| JP | 2006-035293 A | 2/2006 |
| WO | WO-2007/037447 A1 | 4/2007 |

OTHER PUBLICATIONS

Chinese Office Action dated Apr. 25, 2011, issued in corresponding Chinese application No. 200780025356.9 (with partial English translation).

* cited by examiner

*Primary Examiner* — M. Alexandra Elve
(74) *Attorney, Agent, or Firm* — Birch, Stewart, Kolasch & Birch, LLP

(57) ABSTRACT

A stainless steel wire having a flux core for welding zinc-based alloy coated steel sheet having an outer metal sheath coating a core of flux wherein in total having in mass (%) as percentage to the total mass of the wire: C: 0.01-0.05%, Si: 0.1-1.5%, Mn: 0.5-3.0%, Ni: 7.0-10.0%, Cr: 26.0-30.0%, wherein an F value defined as a function of the above components ranges from 30 to 50, the flux further having a slag formation agent in mass (%) as percentage to the total mass of the wire: $TiO_2$: 0.6-2.6%, $SiO_2$: 1.8-3.8%, $ZrO_2$: 1.0-3.5%, and optionally $Al_2O_3$: 0.1-1.0%, wherein the slag formation agent in total is less than 10%, and the wire further containing Fe and residual impurities.

9 Claims, 2 Drawing Sheets

STAINLESS STEEL WIRE WITH FLUX CORE FOR WELDING ZINC COATED STEEL SHEETS

This Application claims priority to Japanese Application No. 2006-185171 and No. 2007-172124 filed in Japan on Jul. 5, 2006 and Jun. 29, 2007 respectively, which are herein incorporated by reference in its entirety.

BACKGROUND OF THE INVENTION

1. Field of the Invention

Present invention relates to a wire having a flux core used for zinc-based alloy coated steel sheet. The wire having a flux core provides a weld portion which has no weld crack and is excellent in corrosion resistance without post-treatment such as touch-up, and in ductility and welding workability.

2. Description of the Related Art

Zinc coated steel sheets are widely used in fields such as building and automobile industries in view of improvement of corrosion resistance of structural members. Conventionally to improve the corrosion resistance, a method is used where an uncoated steel member is welded and then is coated by dipping the welded steel member in a zinc-based alloy bath. However, in this method, since the plating process is carried out after the welding step, productivity is low and equipment such as a plating bath is needed, which causes increased manufacturing costs. To avoid this, a method has been employed wherein steel sheets coated with zinc are welded to build a structure. Recently for further improvement of corrosion resistance of a structural member, a zinc-based alloy coated steel sheet is welded to build a weld structure. The zinc-based alloy coated steel sheet is made for example by plating the surface of steel sheet with Zn—Al—Mg—Si alloy having high corrosion resistance. (For example, see JP2000-064061 A)

As a specific problem caused by the method where a zinc coated steel sheet is welded to build a weld structure, it has been known that a liquid metal embrittlement crack results from melted plating material often occurring at the location of a weld metal and a welded heat affected zone (hereinafter referred to as "zinc embrittlement crack"). It is thought that the zinc embrittlement crack is mainly caused by the fact that melted zinc-based alloy plating components stay on the surface of a welded heat affected zone near the weld portion and break into the crystal grain boundary of the weld portion. It is also thought that a zinc plating material on the surface of weld portion would not be a cause of zinc embrittlement crack since the zinc plating material is evaporated during welding.

As for welding of a stainless steel structure which has needed higher corrosion resistance, same-metal-based welding materials of stainless steel are used. Weld metals of stainless steel formed at joint portions between stainless steels or between stainless steel and carbon steel has a good corrosion resistance as well as stainless steel.

However, according to the results of the present inventors' experiments, it was confirmed that even when using 309 type or 329 type stainless welding materials for obtaining a weld metal excellent in corrosion resistance with respect to welding a zinc coated steel sheet, there were a lot of zinc embrittlement cracks. That is, use of stainless steel welding material does not work with respect to welding of zinc coated steel.

In order to solve the problem of zinc embrittlement cracks, the inventors proposed a wire having a flux core which prevents a weld metal from having zinc embrittlement crack through controlling an area percentage of ferrite structure and tensile strength of the weld metal by adjusting contents of C, Si, Mn, Ni, Cr, and further content of $TiO_2$ in the slag of the wire to an appropriate value. (For example as shown in JP2006-035293 A).

However zinc embrittlement cracks still often occur in using the above-mentioned wire having a flux core depending on the welding conditions, that is, prevention of zinc embrittlement cracks is not consistent. Also an obtained weld metal has low ductility, poor slag-separability and low arc-stability in welding work.

The inventors diligently studied about a joint preventing zinc embrittlement crack, and disclosed the result in WO2007/037447.

BRIEF SUMMARY OF THE INVENTION

An object of the present invention is to provide a stainless steel wire having a flux core used for welding zinc coated steel sheet. The wire having a flux core provides ductility and welding workability and a weld portion which has no zinc embrittlement cracks and is excellent in corrosion resistance without post-treatment such as touch-up, which is a painting treatment.

The inventors studied various alloy components to accomplish the objects and found that the zinc embrittlement cracks can be reduced if the content of the components of the wire, i.e., C, Si, Mn, Ni, Cr are adjusted to appropriate values and are weighted using an F value, i.e., F value (F=3×Cr+4.5×Si−2.8×Ni−84×C−1.4×Mn−19.8). The relationship between the F value and the number of cracks is shown in FIG. 1 (welding conditions are the same as the ones used for checking weld joint performance in the examples described later). As shown in FIG. 1, it was found that as the F value becomes higher, crack formation is more inhibited. If the F value reaches 30, more preferably exceeds 40, crack formation almost disappears.

The F value represents how easily ferrite can be crystallized. If the F value is less than 30, crystallization of austenite occurs during solidification, which allows zinc to break into the austenite grain boundary. This has made it difficult to prevent zinc embrittlement cracks. If the F value is more than 30, preferably more than 40, the ferrite single phase can exist during the whole solidification process from the primary crystals to room temperature, which makes it difficult for zinc to break into the grain boundary and leads to prevention of the crack. In view of preventing zinc embrittlement cracks, a higher F value is preferable. However if F value exceeds 50, the ferrite percentage becomes high, and the amount of austenite which adds to the ductility of the weld portion becomes insufficient. Thus, elongation of the metal cannot be expected enough, which makes it difficult for the weld joint to meet the mechanical properties necessary for the weld joint. The inventors made it clear that both avoiding zinc embrittlement cracks and keeping a sufficient ductility can be satisfied if solidification is terminated with a single ferrite phase and then the austenite phase is precipitated during the cooling process after the solidification to form an adequate two phase structure made of ferrite and austenite.

After various investigations in search of more perfect prevention of zinc embrittlement cracks, it was found that the addition of $Al_2O_3$ to a slag agent can prevent zinc embrittlement cracks. FIG. 2 shows the relationship between the slag agent component $Al_2O_3$ and the number of cracks. As the content of $Al_2O_3$ increases, the number of cracks decreases. When the F value is as low as 20, although cracks were not completely prevented, the number of cracks was reduced. When the F value is 30, an $Al_2O_3$ content of 0.1% or more can perfectly prevent cracks. Zinc remains as a low melting point metal which can be harmful to a crack since generally zinc will usually not make a solid solution with other metal or oxide. However when $Al_2O_3$, which have an affinity to zinc, is added, $Al_2O_3$—ZnO-base oxide is formed. That is, zinc which is harmful to cracks is converted to a slag of oxide which does not cause a crack. That is why the addition of $Al_2O_3$ works as inhibitor of cracks.

As for welding workability, when a zinc coated steel sheet is welded, zinc at the weld portion is evaporated by arc-heat but melted zinc remains in the vicinity. This melted zinc comes to cover the weld portion as it is solidified and cooled and the zinc is fixed to a slag at an edge of a bead that is formed, which inhibits separability of slag. The inventors tried to optimize the slag agent so as to obtain a good coverability and separability of the slag through studying the effect of the amount of primary components of slag agents such as $TiO_2$, $SiO_2$ and $ZrO_2$. As a result, it was found that if the bead edge is covered thick with slag, excellent separability of slag can be obtained even if zinc is fixed to the edge of the bead.

As for welding of zinc coated steel sheets, there is another problem that arc conditions may be unstable due to a disruption in the arc by zinc vapor coming into the arc. It was found that addition of appropriate amounts of $Al_2O_3$ makes the arc stable. The mechanism seems, similar to the effect of the inhibition of cracks mentioned above, i.e., that zinc vapor in the arc and melted $Al_2O_3$ in the slag agent are combined to prompt the formation of Al—Zn-base oxide, which inhibits the arc from becoming unstable by the zinc vapor.

The gist of the present invention is as follows.

Item 1. A stainless steel wire having a flux core for welding a zinc-based alloy coated steel sheet comprising:
an outer metal sheath made of stainless steel covering a core of flux;
wherein the outer metal sheath and the flux in total comprising in mass (%) as percentage to the total mass of the wire the following components:
C: 0.01-0.05%
Si: 0.1-1.5%
Mn: 0.5-3.0%
Ni: 7.0-10.0%
Cr: 26.0-30.0%
wherein the components are contained in an amount satisfying an F value defined as expression (1) described below and ranging from 30 to 50, $$F \text{ value} = 3 \times [Cr\%] + 4.5 \times [Si\%] - 2.8 \times [Ni\%] - 84 \times [C\%] - 1.4 \times [Mn\%] - 19.8 \quad (1)$$

the flux further comprising a slag formation agent wherein said slag formation agent comprises in mass (%) as percentage of the total mass of the wire the following:
$TiO_2$: 0.6-2.6%
$SiO_2$: 1.8-3.8%
$ZrO_2$: 1.0-3.5%
wherein said slag formation agent is less than 10% of the total mass of the wire, and
wherein the wire further comprises Fe and residual impurities.

Item 2. The stainless steel wire having a flux core for welding zinc-based alloy coated steel sheet according to item 1, wherein the slag formation agent further comprises:
$Al_2O_3$: 0.1-1.0%.

A wire having a flux core used for welding zinc coated steel sheet can provide a high quality weld portion which has no weld crack and is excellent in corrosion resistance without post-treatment such as touch-up, and in ductility and welding workability. Particularly, these effects can be significant when the wire of the invention is used for welding Zn—Al—Mg-based alloy coated steel sheet. As examples of Zn—Al—Mg-based alloy coated steel sheet, there are SuperDyma® steel sheet made by NIPPON STEEL CORPORATION and ZAM® steel sheet made by NISSHIN STEEL CO., LTD.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

Figure 1:
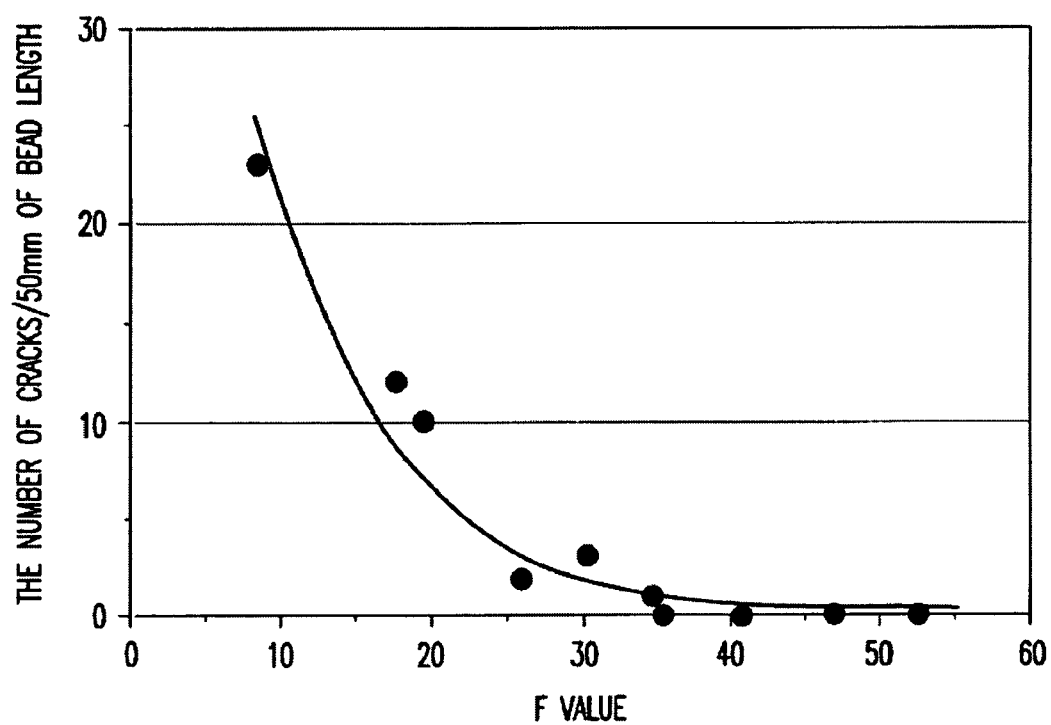
FIG. 1 shows the relationship between F value and the number of cracks.

The inventors diligently studied to improve the corrosion resistance of the weld portion when zinc-based alloy coated steel sheet is welded using stainless-steel-based welding material and prevention of zinc embrittlement cracks resulting from a combination of weld metal including stainless-steel-based component and zinc-based alloy coated layer.

As a result, the following was found.

(1) The sensitivity to zinc embrittlement cracks in weld metal with stainless-steel-based components depends on the solidification type of weld metal. That is, a weld metal having a composition which allows solidification to complete with single ferrite phase has fewer zinc embrittlement cracks than a weld metal having a composition which allows solidification to complete into a single austenite phase or dual phase of austenite and ferrite.

(2) Low melting point components such as Zn, whose presence can contribute to zinc embrittlement cracks derived from zinc-based alloy coated layers, is easily combined with $Al_2O_3$. Therefore, Zn can be eliminated from weld metal in the form of a slag of $Al_2O_3$—ZnO-based oxide by adding $Al_2O_3$.

In view of the above, the goal(s) of the present invention is/are as follows:

(1) optimizing the ferrite formation component and the austenite formation component in a wire having a flux core which are added in the form of metal or alloy so that the weld metal can terminate the solidification with a single ferrite phase in order to inhibit the occurrence of zinc embrittlement cracks in the weld metal with a stainless-steel-based component; and/or (2) adding a proper amount of $Al_2O_3$ included in a wire having a flux core as a slag formation agent so as to eliminate low melting point components such as Zn derived from zinc-based alloy coated layer from weld metals.

In this invention, "the zinc-based alloy coated steel sheet" is a collective term used to describe a coated steel sheet made by forming a Zn—Al-based alloy, Zn—Al—Mg-based alloy or Zn—Al—Mg—Si-based alloy, by adding Al, Mg, and/or Si to a zinc coated layer on a steel sheet.

In the first place, the F value of components of the wire having a flux core, which is an important factor in connection with prevention of zinc embrittlement cracks of weld metal. In the second place, the F value of components of the wire having a flux core and $Al_2O_3$, which are particularly important factors in connection with prevention of zinc embrittlement cracks of weld metal.

They are explained below.

According to the inventors' experimental results, weld metals of austenite stainless steel can be classified into two types depending on the composition. Type 1: Solidification after welding is completed with the formation of a single austenite phase or single ferrite phase. Type 2: Solidification after welding is completed with the formation of both an austenite phase and a ferrite phase. It was found that the ease of ferrite crystallization can be defined as expression (1) determined mainly based on ferrite formation elements such as Si or Cr and austenite formation elements such as C, Mn or Ni, wherein expression (1) is as follows:

$$F \text{ value}=3\times[Cr\%]+4.5\times[Si\%]-2.8\times[Ni\%]-84\times[C\%]-1.4\times[Mn\%]-19.8 \quad (1)$$

Each of [Cr %], [Si %], [Ni %], [C %], [Mn %] represents mass (%) of each component as percentage to the total mass of the wire.

FIG. 1 shows the relationship between the number of zinc embrittlement cracks and the F value of wire having a flux core used for welding zinc-based alloy coated steel sheet.

As shown in FIG. 1, as the F value of the wire having a flux core increases, the number of zinc embrittlement cracks decreases. When the F value exceeds 30, and preferably exceeds 40, cracks are hardly formed.

If the F value of the wire having a flux core is less than 30, either the solidified phase of primary crystals of the weld metal is austenite and the solidification is completed with the formation of a single austenite phase, or the solidified phase of the primary crystal is ferrite and then austenite is crystallized in the process of solidification, then the solidification is finally completed with a dual phase of ferrite and austenite. In this case, the austenite phase is solidified as a columnar crystal which allows low melting components such as Zn derived from zinc-based alloy coated layer to break (or migrate) into the austenite grain boundary, which leads to zinc embrittlement cracks of the weld metal. If the F value of wire having a flux core is more than 30, the primary crystal is precipitated as ferrite and solidification is completed with a single ferrite phase. As the ferrite phase is an equiaxed crystal and fine, it is hard for a low melting component such as Zn to break (or migrate) into the grain boundary, which leads to a decrease in the number of zinc embrittlement cracks. When the F value exceeds 40, the amount of austenite precipitation during the cooling process after the completion of solidification is reduced, which leads to further resistance to the formation of zinc embrittlement cracks.

As described above, in the present invention, each content of C, Si, Mn, Ni and Cr of the wire having a flux core is to be adjusted and optimized so that the F value as defined in the expression (1) becomes more than 30, preferably more than 40 in order to inhibit the occurrence of zinc embrittlement cracks of the weld metal.

As shown in FIG. 1, a higher F value is preferable in view of resistance to the formation of zinc embrittlement cracks. However if the F value of the wire exceeds 50, the amount of austenite precipitated during the cooling process after the weld metal has solidified completely with a single ferrite phase is extremely reduced. Therefore, the content of ferrite in the weld metal becomes relatively large at room temperatures. In order to secure an appropriate ductility (i.e., elongation of weld metal), specific amounts of austenite precipitation is required. Thus, extremely high F values are not preferable.

In view of above, the upper limit of the F value should be 50 in the invention so that the structure of the weld metal at room temperature includes a dual phase of ferrite and austenite, which makes it possible both to inhibit the crack and to secure the ductility of weld metal.

Further, a relation between the cracks and content of $Al_2O_3$ which is a component of the slag agent in the wire having a flux core was studied in the cases where the F value was 20 (outside the scope of the invention), 30 and 40 (within the scope of the invention) respectively.

Figure 2:
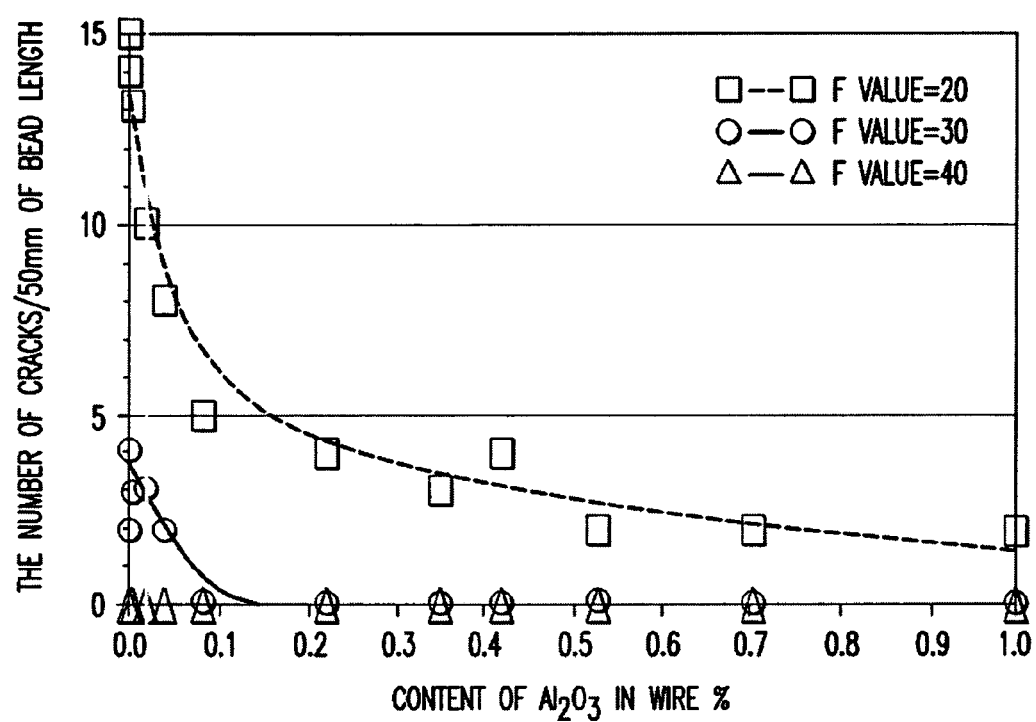
FIG. 2 shows the relationship between the slag agent component $Al_2O_3$ and the number of cracks.

FIG. 2 shows the relationship between the content of the slag agent component $Al_2O_3$ in the wire having a flux core and the number of zinc embrittlement cracks in the weld metal.

When the F value of the wire was at either 20, 30 or 40, as the $Al_2O_3$ content (in mass (%) as percentage to the total mass of the wire) in the wire having a flux core increases, the occurrence of zinc embrittlement cracks of the weld metal is more strongly inhibited. A low melting point component such as zinc in the zinc-based alloy coated layer is melted due to welding heat input at welding. However, zinc can hardly make a solid solution with other metals or oxides, thus zinc remains as a low melting point metal harmful to a crack when solidification of the weld metal is completed. When $Al_2O_3$ which has an affinity to zinc is added, however, an $Al_2O_3$—ZnO-based oxide is formed, which is eliminated as a slag from the weld metal. Therefore, the occurrence of zinc embrittlement cracks is reduced.

When the F value is as low as 20 (outside the scope of the invention), it is impossible to completely prevent the occurrence of cracks since the sensitivity of zinc embrittlement cracks increases as explained above. The occurrence of cracks can be prevented when the F value becomes 30 or more, preferably 40 or more (within the scope of the invention), and also A1203 is added to the wire having a flux core as a slag agent up to content of 0.1% (in mass (%) as percentage to the total mass of the wire). In view of this, the F value of the wire should be 30 or more preferably 40 or more and the content of $Al_2O_3$ as the slag agent in the wire having a flux core should be 0.1% (in mass (%) as percentage to the total mass of the wire). Described above is the reason for limiting the F value and content of $Al_2O_3$ regarding wire components. Furthermore, components in the form of metal or alloy and a slag formation agent to be added to the wire having a flux core should be limited as follows in terms of characteristic of weld metal and welding workability. The followings are reasons for addition and limitation of components of the invention. Each content of components C, Si, Mn, Ni and Cr, contained as metal or alloy in an outer metal sheath and a core of flux, is limited as follows (in mass (%) as percentage to the total mass of the wire).

C: C is harmful to corrosion resistance. However C is added up to 0.01% or more in order to secure the strength of weld metal and to stabilize the arc at welding. If the content exceeds 0.05%, a fair amount of carbide is precipitated, which lowers ductility of weld metal. Therefore, C contained in the outer metal sheath and the core of flux is 0.01-0.05%.

Si: Si is added up to 0.1% or more in order to provide a good slag separability. If added up to more than 1.5%, $SiO_2$-based oxide with low melting point is precipitated, which lowers ductility of weld metal. Therefore, Si contained in the outer metal sheath and the core of flux is 0.1-1.5%.

Mn: Mn is added up to 0.5% or more in order to stabilize an austenite phase in the weld metal structure at room temperature to provide a ductility of the weld metal. If the content of Mn exceeds 3.0%, slag separability becomes poor. Therefore, Mn contained in the outer metal sheath and the core of flux is 0.5-3.0%.

Ni: Ni is an element for forming austenite and is added up to 7.0% or more in order to stabilize an austenite phase in the weld metal structure at room temperature and to provide a ductility of the weld metal. If the content of Ni exceeds 10.0%, segregation of minor components such as P and S harmful to cracking is expedited, which makes it easier to form cracks. Therefore, Ni contained in the outer metal sheath and the core of flux is 7.0-10.0%, preferably 8.0-10.0%.

Cr: Cr is an element for improving corrosion resistance of the weld metal. Cr is also an element for forming ferrite and is added to make the weld metal solidify with a single ferrite phase and to inhibit the formation of zinc embrittlement cracks in weld metal. The Cr content should be 26.0% or more to obtain a sufficient corrosion resistance of the weld metal. Normally, 13.0% of Cr content can provide a good corrosion resistance of stainless steel weld metal. However, this invention is to be applied to zinc coated steel sheet which does not contain Cr. Considering that the Cr content of weld metal should be kept about 13% even if the weld metal is diluted by 50% with base material, the Cr content is concluded to be 26.0% or more. If the content exceeds 30.0%, a carbide such as $Cr_{23}C_6$ or σ phase is precipitated, which makes it difficult to provide appropriate ductility.

Therefore, Cr contained in the outer metal sheath and the core of flux is 26.0-30.0%.

Further, each content (in mass (%) as percentage to the total mass of the wire) of components C, Si, Mn, Ni and Cr, contained in the outer metal sheath and the core of flux is adjusted so that the F value defined as expression (1) can fall in between 30 and 50. As components other than the component defined in the above mentioned invention, the alloy content such as Mo, Cu, V, Nb, Bi, or N can be added for improving the 0.2%-yield strength, tensile strength, ductility (entire elongation), mechanical property such as Charpy impact absorbing energy at 0° C., and slag separability.

However, the N content should be less than 0.05% to avoid deterioration of ductility. Also, a deoxidizing agent such as Al, Mg, Ti for deoxidizing the weld portion can be added.

As for $TiO_2$, $SiO_2$, $ZrO_2$, $Al_2O_3$ which are components used in the slag formation agent in the flux, the content of each component (in mass (%) as percentage to the total mass of the wire) is limited as follows.

$TiO_2$: The content of $TiO_2$ should be 0.6% or more in order to have a slag excellent in coverability. However, if the content exceeds 2.6%, spatter increases. Therefore, the content of $TiO_2$ should be 0.6-2.6%. By adding an appropriate amount of $TiO_2$ together with $SiO_2$ and $ZrO_2$ (described later), a good coverability and separability of the slag can be obtained. More precisely, even if zinc is fixed to a slag at the edge of the weld bead, the slag is easily separable since the edge is covered with slag of appropriate thickness.

$SiO_2$: The content of $SiO_2$ should be 1.8% or more in order to have a slag excellent in separability. However if the content exceeds 3.8%, spatter increases. Therefore, the content of $SiO_2$ should be 1.8-3.8%. Unlike $ZrO_2$, $SiO_2$ is added to make slag separability generally better with the entire weld bead no matter whether zinc is fixed to or not.

$ZrO_2$: The content of $ZrO_2$ should be 1.0% or more in order to have an excellent slag separability even if zinc is fixed to a slag at the edge of weld bead. However, if the content exceeds 3.5%, spatter increases. Therefore, the content of $ZrO_2$ should be 1.0-3.5%.

$Al_2O_3$: The content of $Al_2O_3$ should be 0.1% or more in order to inhibit zinc embrittlement crack, in addition, to make an arc stable even if zinc vapor comes into the arc. However, if the content exceeds 1.0%, spatter increases. Therefore, the content of $Al_2O_3$ should be 0.1-1.0%.

In this invention, it is possible to include in the slag formation agent other than $SiO_2$, $TiO_2$, $ZrO_2$ and $Al_2O_3$ in the flux of the core of the wire. However, if the content of total slag formation agent exceeds 10.0%, spatter increases at welding. Therefore, the content of the slag formation agent should be 10% or less.

There is no specific lower limit of the content of the slag formation agent. However the lower limit is preferably 5% in order to keep a good slag coverablity with surface of weld metal.

The slag formation agent can include components other than above-mentioned $TiO_2$, $SiO_2$, $ZrO_2$, $Al_2O_3$, such as the following components which have additional functions. A fixing agent such as potassium silicate or sodium silicate which is used for manufacturing bond flux of the wire manufacturing process, metal oxide or metal carbide such as $Na_2O$, $K_2O$, $CaCO_3$, $BaCO_3$ used as arc stabilizing agents, fluorides such as $AlF_3$, $NaF$, $K_2ZrF_6$, $LiF$ used for adjusting viscosity of slag or securing separability of slag, and iron oxide such as $FeO$, $Fe_2O_3$ can be included as components of the slag formation agent.

As a method for manufacturing stainless steel wire having a flux core for welding zinc-based alloy based on this invention, known methods for manufacturing wire having a flux core can be used.

For example, after forming a U-shaped steel from a steel strip (to be an outer metal sheath) made of austenite-based stainless steel including above-mentioned metal or alloy, filling a filling flux, which is prepared in advance by blending, mixing and drying the above-mentioned metal or alloy and slag formation agent, up in the U-shaped gutter, then transforming the U-shaped steel strip into tube-shaped and finally carrying out a wire-drawing to obtain a wire with predetermined diameter.

Also, by welding a seam of a tube-shaped wire, seamless type wire having a flux core can be obtained.

As a method other than above, a molded tube can be used as an outer metal sheath. In this case, flux is filled up in the tube applying vibration to the tube and then the tube is drawn up to predetermined diameter.

EXAMPLES

All concentrations are in mass % based on the total mass of the wire unless otherwise indicated. Test samples of wire having a flux core for welding zinc-based alloy coated steel sheets, have a composition as shown in Tables 2 and 3. Chemical components of the outer metal sheath of austenite-based stainless steel is shown in Table 1.

TABLE 1

| symbol | C | Si | Mn | P | S | Ni | Cr | Mo | N | O |
|---|---|---|---|---|---|---|---|---|---|---|
| W 1 | 0.018 | 0.41 | 1.60 | 0.022 | 0.002 | 10.3 | 18.6 | 0.04 | 0.02 | 0.006 |
| W 2 | 0.021 | 0.57 | 0.98 | 0.027 | 0.005 | 9.1 | 18.3 | 0.16 | 0.05 | 0.004 |
| W 3 | 0.004 | 0.04 | 0.35 | 0.025 | 0.001 | 9.5 | 18.0 | 0.50 | 0.03 | 0.005 |

TABLE 2

| Wire No. | | 0 | 1 | 2 | 3 | 4 | 5 | 6 |
|---|---|---|---|---|---|---|---|---|
| Filling flux (in mass (%) as percentage to the total mass of the wire) | $TiO_2$ | 1.38 | 0.70 | 2.50 | 0.90 | 0.90 | 0.90 | 1.00 |
| | $SiO_2$ | 2.75 | 2.30 | 1.80 | 1.90 | 3.60 | 2.50 | 1.80 |
| | $ZrO_2$ | 1.84 | 1.80 | 1.20 | 2.00 | 1.30 | 1.10 | 3.20 |
| | $Al_2O_3$ | 0.63 | 0.50 | 0.50 | 0.60 | 0.20 | 0.60 | 0.25 |
| | $FeO + Fe_2O_3$ | 0.51 | 0.50 | 0.50 | 0.50 | * | 0.30 | 0.10 |
| | $Na_2O$ | 0.11 | 0.10 | 0.05 | 0.10 | 0.05 | 0.10 | 0.08 |
| | $K_2O$ | 0.11 | 0.10 | 0.05 | 0.10 | * | 0.10 | * |
| | other | 0.11 | 0.50 | 0.70 | 0.30 | 0.10 | 0.25 | 0.10 |
| | $AlF_3$ | 0.09 | * | * | 0.07 | * | * | * |
| | NaF | * | 0.10 | 0.20 | * | * | 0.20 | * |
| | $K_2ZrF_6$ | * | * | * | * | * | * | 0.10 |
| | LiF | * | * | * | * | 0.10 | * | * |
| | Total slag agent | 7.53 | 6.60 | 7.50 | 6.47 | 6.25 | 6.05 | 6.63 |
| | C | * | * | * | * | * | * | * |
| | Si | * | * | * | 0.50 | 1.00 | * | 0.65 |
| | Mn | * | * | * | * | 0.20 | 1.80 | * |
| | Ni | 0.78 | 0.30 | 1.30 | 1.00 | | 0.50 | 0.20 |
| | Cr | 12.54 | 13.00 | 12.10 | 11.90 | 15.00 | 11.60 | 14.00 |
| | Fe | 1.03 | 3.95 | 0.50 | 3.50 | * | * | * |
| | Bi | 0.07 | 0.05 | 0.05 | 0.03 | 0.05 | 0.05 | 0.02 |
| | Other alloy | 0.05 | 0.10 | 0.05 | 0.10 | * | * | * |
| Filling percent % | | 22.00 | 24.00 | 22.00 | 24.00 | 21.50 | 20.00 | 21.50 |
| Sheath percent % | | 78.00 | 76.00 | 78.00 | 76.00 | 78.50 | 80.00 | 78.50 |
| Sheath symbol | | W1 | W2 | W1 | W1 | W1 | W2 | W2 |
| Sheath composition % | C | 0.018 | 0.021 | 0.018 | 0.018 | 0.018 | 0.021 | 0.021 |
| | Si | 0.41 | 0.57 | 0.41 | 0.41 | 0.41 | 0.57 | 0.57 |
| | Mn | 1.60 | 0.98 | 1.60 | 1.60 | 1.60 | 0.98 | 0.98 |
| | Ni | 10.3 | 9.1 | 10.3 | 10.3 | 10.3 | 9.1 | 9.1 |
| | Cr | 18.6 | 18.3 | 18.6 | 18.6 | 18.6 | 18.3 | 18.3 |
| Wire composition % | C | 0.014 | 0.016 | 0.014 | 0.014 | 0.014 | 0.017 | 0.016 |
| | Si | 0.32 | 0.43 | 0.82 | 1.31 | 0.32 | 0.46 | 1.10 |
| | Mn | 1.25 | 0.74 | 1.25 | 1.22 | 1.46 | 2.58 | 0.77 |
| | Ni | 8.81 | 7.22 | 9.33 | 8.83 | 8.09 | 7.78 | 7.34 |
| | Cr | 27.05 | 26.91 | 26.61 | 26.04 | 29.60 | 26.24 | 28.37 |
| | F Value | 35 | 40 | 35 | 37 | 45 | 34 | 47 |
| | | | | Examples of the present invention | | | | |

| Wire No. | | 7 | 8 | 9 | 10 | 11 | 12 | 25 |
|---|---|---|---|---|---|---|---|---|
| Filling flux (in mass (%) as percentage to the total mass of the wire) | $TiO_2$ | 0.85 | 1.00 | 1.00 | 1.80 | 1.00 | 1.00 | 1.00 |
| | $SiO_2$ | 2.20 | 2.20 | 2.00 | 2.80 | 2.00 | 2.00 | 2.00 |
| | $ZrO_2$ | 2.00 | 2.15 | 1.50 | 2.80 | 1.50 | 1.50 | 1.50 |
| | $Al_2O_3$ | 0.20 | 0.90 | 0.20 | 0.80 | 0.50 | 0.50 | 0.02 |
| | $FeO + Fe_2O_3$ | 0.10 | 0.10 | 0.10 | 0.50 | 0.20 | 0.20 | 0.20 |
| | $Na_2O$ | 0.08 | 0.08 | 0.05 | * | * | 0.20 | 0.10 |
| | $K_2O$ | * | * | * | 0.50 | 0.20 | * | 0.10 |
| | other | 0.10 | 0.10 | 0.10 | 0.10 | * | * | 0.30 |
| | $AlF_3$ | * | * | * | * | 0.50 | * | * |
| | NaF | * | * | 0.30 | * | * | 0.50 | 0.50 |
| | $K_2ZrF_6$ | 0.10 | 0.10 | * | * | * | * | * |
| | LiF | * | * | * | 0.50 | 0.60 | 0.10 | * |
| | Total slag agent | 5.63 | 6.63 | 5.25 | 9.80 | 6.50 | 6.00 | 5.72 |
| | C | * | * | 0.02 | * | 0.01 | 0.03 | * |
| | Si | 0.65 | 0.65 | 0.15 | 1.00 | 0.50 | * | 0.30 |
| | Mn | * | * | 1.00 | | 0.40 | 1.50 | 0.20 |
| | Ni | 0.20 | 0.20 | * | * | * | * | * |
| | Cr | 14.00 | 14.00 | 15.06 | 13.00 | 12.00 | 12.40 | 13.70 |
| | Fe | * | * | * | 0.18 | 0.54 | 0.06 | 0.55 |
| | Bi | 0.02 | 0.02 | 0.02 | 0.02 | 0.05 | 0.01 | 0.03 |
| | Other alloy | * | * | * | * | * | * | * |
| Filling percent % | | 20.50 | 21.50 | 21.50 | 24.00 | 20.00 | 20.00 | 20.50 |
| Sheath percent % | | 79.50 | 78.50 | 78.50 | 76.00 | 80.00 | 80.00 | 79.50 |
| Sheath symbol | | W2 | W2 | W3 | W1 | W3 | W1 | W1 |
| Sheath composition % | C | 0.021 | 0.021 | 0.004 | 0.018 | 0.004 | 0.018 | 0.018 |
| | Si | 0.57 | 0.57 | 0.04 | 0.41 | 0.04 | 0.41 | 0.41 |
| | Mn | 0.98 | 0.98 | 0.35 | 1.60 | 0.35 | 1.60 | 1.60 |
| | Ni | 9.1 | 9.1 | 10.3 | 10.3 | 10.3 | 10.3 | 10.3 |
| | Cr | 18.3 | 18.3 | 18.6 | 18.6 | 18.6 | 18.6 | 18.6 |
| Wire composition % | C | 0.017 | 0.016 | 0.023 | 0.014 | 0.013 | 0.044 | 0.014 |
| | Si | 1.10 | 1.10 | 0.18 | 1.31 | 0.53 | 0.33 | 0.63 |
| | Mn | 0.78 | 0.77 | 1.27 | 1.22 | 0.68 | 2.78 | 1.47 |
| | Ni | 7.43 | 7.34 | 8.09 | 7.83 | 8.24 | 8.24 | 8.19 |
| | Cr | 28.55 | 28.37 | 29.66 | 27.14 | 26.88 | 27.28 | 28.49 |
| | F Value | 47 | 47 | 44 | 43 | 38 | 33 | 42 |
| | | | | Examples of the present invention | | | | |

* represents level of impurity

TABLE 3

| Wire No. | | 13 | 14 | 15 | 16 | 17 | 18 | 19 | 20 | 21 | 22 | 23 | 24 |
|---|---|---|---|---|---|---|---|---|---|---|---|---|---|
| Filling flux (in mass (%) as percentage to the total mass of the wire) | $TiO_2$ | 0.50 | 2.80 | 1.00 | 0.80 | 1.00 | 0.90 | 1.40 | 1.00 | 1.00 | 2.50 | 1.00 | 1.20 |
| | $SiO_2$ | 2.65 | 1.90 | 1.60 | 4.10 | 2.50 | 1.80 | 2.50 | 2.50 | 2.00 | 3.50 | 2.10 | 2.20 |
| | $ZrO_2$ | 1.85 | 1.20 | 2.00 | 1.10 | 0.80 | 3.70 | 1.60 | 1.60 | 1.00 | 2.00 | 1.30 | 1.50 |
| | $Al_2O_3$ | 0.60 | 0.50 | 0.60 | 0.20 | 0.60 | 0.20 | 1.20 | 0.03 | 0.20 | 0.80 | 0.30 | 0.60 |
| | $FeO + Fe_2O_3$ | 0.50 | 0.50 | 0.50 | * | 0.30 | 0.10 | 0.50 | 0.50 | * | 0.10 | 0.10 | 0.10 |
| | $Na_2O$ | 0.10 | 0.05 | 0.10 | 0.05 | 0.10 | 0.08 | 0.10 | * | 0.10 | 0.10 | 0.10 | * |
| | $K_2O$ | 0.10 | 0.05 | 0.10 | * | 0.10 | * | * | 0.10 | * | 0.10 | * | 0.10 |
| | other | 0.50 | 0.10 | 0.30 | 0.10 | 0.25 | 0.10 | 0.20 | 0.30 | 0.05 | 1.00 | * | 0.10 |
| | $AlF_3$ | 0.10 | * | * | * | * | * | * | * | * | 0.50 | * | * |
| | NaF | * | 0.20 | * | * | 0.20 | * | 0.10 | * | * | 0.30 | 0.30 | * |
| | $K_2ZrF_6$ | * | * | 0.15 | * | * | 0.10 | * | 0.07 | * | 0.20 | * | 0.30 |
| | LiF | * | * | * | 0.10 | * | * | * | * | * | * | * | * |
| | Total slag agent | 6.90 | 7.30 | 6.35 | 6.45 | 5.85 | 6.98 | 7.60 | 6.10 | 4.35 | 11.10 | 5.20 | 6.10 |
| | C | * | * | * | * | * | * | * | 0.05 | 0.02 | * | 0.02 | * |
| | Si | * | 0.50 | 1.00 | * | 0.10 | 0.80 | 0.80 | * | * | 1.50 | 0.40 | * |
| | Mn | * | * | * | 1.00 | 2.00 | | 2.00 | * | 0.50 | * | * | 2.00 |
| | Ni | * | 2.50 | 1.00 | * | 2.50 | 0.20 | 2.00 | 0.80 | * | * | * | * |
| | Cr | 13.00 | 12.10 | 10.02 | 16.50 | 12.00 | 16.00 | 12.00 | 12.00 | 12.00 | 12.18 | 13.00 | 15.00 |
| | Fe | 3.95 | 0.50 | 3.50 | * | * | * | * | 0.95 | 2.28 | * | 0.30 | 1.00 |
| | Bi | 0.05 | 0.05 | 0.03 | 0.05 | 0.05 | 0.02 | 0.05 | 0.04 | 0.05 | 0.02 | 0.05 | 0.02 |
| | Other alloy | 0.10 | 0.05 | 0.10 | * | * | * | 0.35 | 0.56 | 0.30 | 0.20 | 0.03 | 0.08 |
| Filling percent % | | 24.00 | 23.00 | 22.00 | 24.00 | 22.50 | 24.00 | 24.80 | 20.50 | 19.50 | 25.00 | 19.00 | 24.20 |
| Sheath percent % | | 76.00 | 77.00 | 78.00 | 76.00 | 77.50 | 76.00 | 75.20 | 79.50 | 80.50 | 75.00 | 81.00 | 75.80 |
| Sheath symbol | | W2 | W1 | W1 | W1 | W2 | W2 | W3 | W1 | W3 | W1 | W3 | W1 |
| Sheath composition % | C | 0.021 | 0.018 | 0.018 | 0.018 | 0.021 | 0.021 | 0.004 | 0.018 | 0.004 | 0.018 | 0.004 | 0.018 |
| | Si | 0.57 | 0.41 | 0.41 | 0.41 | 0.57 | 0.57 | 0.04 | 0.41 | 0.04 | 0.41 | 0.04 | 0.41 |
| | Mn | 0.98 | 1.60 | 1.60 | 1.60 | 0.98 | 0.98 | 0.35 | 1.60 | 0.35 | 1.60 | 0.35 | 1.60 |
| | Ni | 9.1 | 10.3 | 10.3 | 10.3 | 9.1 | 9.1 | 10.3 | 10.3 | 10.3 | 10.3 | 10.3 | 10.3 |
| | Cr | 18.3 | 18.6 | 18.6 | 18.6 | 18.3 | 18.3 | 18.6 | 18.6 | 18.6 | 18.6 | 18.6 | 18.6 |
| Wire composition % | C | 0.016 | 0.014 | 0.014 | 0.014 | 0.016 | 0.016 | 0.003 | 0.064 | 0.023 | 0.014 | 0.023 | 0.014 |
| | Si | 0.43 | 0.82 | 1.32 | 0.31 | 0.54 | 1.23 | 0.83 | 0.33 | 0.03 | 1.81 | 0.43 | 0.31 |
| | Mn | 0.74 | 1.23 | 1.25 | 2.22 | 2.76 | 0.74 | 2.26 | 1.27 | 0.78 | 1.20 | 0.28 | 3.21 |
| | Ni | 6.92 | 10.43 | 9.03 | 7.83 | 9.55 | 7.12 | 9.75 | 8.99 | 8.29 | 7.73 | 8.34 | 7.81 |
| | Cr | 26.91 | 26.42 | 24.53 | 30.64 | 26.18 | 29.91 | 25.99 | 26.79 | 26.97 | 26.13 | 28.07 | 29.10 |
| | F value | 41 | 31 | 32 | 47 | 29 | 53 | 31 | 30 | 35 | 42 | 41 | 41 |
| | | | | | | | Comparison examples | | | | | | |

* represents level of impurity

As for deposited metal performance, a tensile test was carried out according to JIS Z 3323. An impact test was carried out according to JIS Z 3111. In a weld joint performance check, the following steel sheets were used: hot-dip zinc coated steel sheet of JIS G 3302, hot-dip zinc-5% Al alloy coated steel sheet of JIS G 3317, hot-dip 55% Al-zinc alloy coated steel sheet of JIS G 3321, and SuperDyma® steel sheet made by NIPPON STEEL CORPORATION (Zn-11% Al-3% Mg-0.2% Si coated). In the welding, a steel sheet with 3 mm thickness was used having a gap of 0-3 mm, no groove, and copper plate backing. Then a crack with a weld joint portion was checked using radiation transmission according to JIS Z 3106. In addition, dye penetration flaw inspection was carried out to check the zinc embrittlement crack of weld metal. Corrosion resistance was checked according to the JIS Z 2371 salt spray test (SST) where testing time was 500 hours. Performance was evaluated "good" if elongation of deposited metal was 10% or more. In radiation transmission test and dye penetration flaw inspection, evaluation of "good" was provided if no crack was observed. As for corrosion resistance, visual observation was made. If red rust was not observed in weld portion and heat-affected zone except base material cut surface, evaluation of "good" was provided. Evaluation of welding workability was made by sensory evaluation at preparation of weld joint. As for deposited metal test, weld joint test and welding workability check, the following condition was used: welding current 120-250A, down hand welding, and shield gas $CO_2$. The results are shown in Table 4 and Table 5.

TABLE 4

| | Wire No. | 0 | 1 | 2 | 3 | 4 | 5 | 6 |
|---|---|---|---|---|---|---|---|---|
| Composition of deposited metal mass % | C | 0.03 | 0.02 | 0.03 | 0.02 | 0.02 | 0.02 | 0.02 |
| | Si | 0.61 | 0.65 | 0.75 | 0.95 | 0.62 | 0.65 | 0.80 |
| | Mn | 0.86 | 0.62 | 0.85 | 0.79 | 0.91 | 1.56 | 0.76 |
| | P | 0.020 | 0.021 | 0.013 | 0.015 | 0.014 | 0.019 | 0.012 |
| | S | 0.007 | 0.006 | 0.008 | 0.005 | 0.004 | 0.003 | 0.006 |
| | Ni | 9.33 | 8.40 | 10.20 | 9.21 | 8.12 | 8.13 | 7.89 |
| | Cr | 27.06 | 26.89 | 26.54 | 25.98 | 28.96 | 26.33 | 28.43 |
| | Mo | 0.10 | 0.10 | 0.05 | 0.11 | 0.04 | 0.03 | 0.04 |
| | N | 0.02 | 0.01 | 0.02 | 0.02 | 0.03 | 0.02 | 0.01 |
| | O | 0.17 | 0.17 | 0.18 | 0.12 | 0.14 | 0.16 | 0.14 |
| Performance of deposited metal | 0.2% yield strength MPa | 600 | 602 | 587 | 608 | 624 | 612 | 599 |
| | Tensile strength MPa | 720 | 704 | 669 | 705 | 735 | 715 | 698 |

TABLE 4-continued

|  |  |  |  |  |  |  |  |  |
|---|---|---|---|---|---|---|---|---|
|  | Elongation % | 19 | 14 | 21 | 18 | 12 | 16 | 19 |
|  | vE 0° C. J | 22 | 18 | 22 | 24 | 28 | 19 | 21 |
| Performance of weld joint | crack | Not found | Not found | Not found | Not found | Not found | Not found | Not found |
|  | Corrosion resistance | good | good | good | good | good | good | good |
| Welding workability | Arc stability | ○ | ○ | ○ | ○ | ○ | ○ | ○ |
|  | spatter | ○ | ○ | ○ | ○ | ○ | ○ | ○ |
|  | Slag coverability | ○ | ○ | ○ | ○ | ○ | ○ | ○ |
|  | Slag separability | ○ | ○ | ○ | ○ | ○ | ○ | ○ |
| Overall evaluation |  | ○ | ○ | ○ | ○ | ○ | ○ | ○ |
|  |  | Examples of the present invention | | | | | | |

|  | Wire No. | 7 | 8 | 9 | 10 | 11 | 12 | 25 |
|---|---|---|---|---|---|---|---|---|
| Composition of deposited metal mass % | C | 0.02 | 0.02 | 0.04 | 0.02 | 0.02 | 0.05 | 0.02 |
|  | Si | 0.95 | 0.91 | 0.50 | 0.98 | 0.70 | 0.62 | 0.68 |
|  | Mn | 0.65 | 0.68 | 0.89 | 0.87 | 0.72 | 1.90 | 0.88 |
|  | P | 0.015 | 0.019 | 0.011 | 0.015 | 0.012 | 0.001 | 0.018 |
|  | S | 0.005 | 0.004 | 0.011 | 0.002 | 0.005 | 0.006 | 0.006 |
|  | Ni | 7.58 | 7.65 | 8.65 | 8.12 | 8.92 | 8.65 | 8.55 |
|  | Cr | 28.12 | 28.60 | 30.12 | 27.56 | 27.10 | 27.32 | 28.53 |
|  | Mo | 0.05 | 0.04 | 0.05 | 0.10 | 0.50 | 0.10 | 0.12 |
|  | N | 0.02 | 0.03 | 0.02 | 0.03 | 0.04 | 0.04 | 0.03 |
|  | O | 0.16 | 0.18 | 0.12 | 0.15 | 0.13 | 0.15 | 0.14 |
| Performance of deposited metal | 0.2% yield strength MPa | 611 | 624 | 558 | 655 | 589 | 602 | 598 |
|  | Tensile strength MPa | 708 | 715 | 705 | 706 | 698 | 705 | 723 |
|  | Elongation % | 15 | 18 | 21 | 15 | 17 | 21 | 17 |
|  | vE 0° C. J | 20 | 19 | 23 | 18 | 16 | 28 | 25 |
| Performance of weld joint | crack | Not found | Not found | Not found | Not found | Not found | Not found | Not found |
|  | Corrosion resistance | good | good | good | good | good | good | good |
| Welding workability | Arc stability | ○ | ○ | ○ | ○ | ○ | ○ | ○ |
|  | spatter | ○ | ○ | ○ | ○ | ○ | ○ | ○ |
|  | Slag coverability | ○ | ○ | ○ | ○ | ○ | ○ | ○ |
|  | Slag separability | ○ | ○ | ○ | ○ | ○ | ○ | ○ |
| Overall evaluation |  | ○ | ○ | ○ | ○ | ○ | ○ | ○ |
|  |  | Examples of the present invention | | | | | | |

TABLE 5

|  | Wire No. | 13 | 14 | 15 | 16 | 17 | 18 | 19 | 20 | 21 | 22 | 23 | 24 |
|---|---|---|---|---|---|---|---|---|---|---|---|---|---|
| Composition of deposited metal (mass %) | C | 0.03 | 0.03 | 0.02 | 0.02 | 0.03 | 0.04 | 0.01 | 0.06 | 0.05 | 0.03 | 0.04 | 0.02 |
|  | Si | 0.50 | 0.90 | 0.89 | 0.60 | 0.75 | 0.95 | 0.89 | 0.52 | 0.25 | 1.20 | 0.70 | 0.59 |
|  | Mn | 0.58 | 0.85 | 0.87 | 1.40 | 1.80 | 0.56 | 1.76 | 0.85 | 0.66 | 0.92 | 0.25 | 1.98 |
|  | P | 0.023 | 0.018 | 0.019 | 0.015 | 0.013 | 0.014 | 0.019 | 0.020 | 0.015 | 0.012 | 0.011 | 0.015 |
|  | S | 0.007 | 0.005 | 0.006 | 0.008 | 0.005 | 0.004 | 0.005 | 0.004 | 0.005 | 0.002 | 0.009 | 0.003 |
|  | Ni | 7.10 | 10.82 | 9.55 | 8.90 | 10.21 | 8.02 | 10.15 | 9.10 | 8.90 | 8.12 | 8.72 | 8.32 |
|  | Cr | 27.01 | 26.52 | 24.52 | 30.20 | 26.11 | 29.85 | 26.01 | 26.30 | 26.90 | 26.12 | 28.12 | 29.20 |
|  | Mo | 0.05 | 0.06 | 0.05 | 0.06 | 0.03 | 0.04 | 0.05 | 0.04 | 0.03 | 0.02 | 0.05 | 0.03 |
|  | N | 0.02 | 0.02 | 0.01 | 0.03 | 0.03 | 0.02 | 0.03 | 0.05 | 0.02 | 0.03 | 0.03 | 0.02 |
|  | O | 0.15 | 0.13 | 0.16 | 0.15 | 0.18 | 0.13 | 0.15 | 0.16 | 0.12 | 0.11 | 0.15 | 0.11 |
| Performance of deposited metal | 0.2% yield strength MPa | 598 | 487 | 598 | 599 | 544 | 605 | 602 | 589 | 556 | 598 | 587 | 556 |
|  | Tensile strength MPa | 712 | 612 | 689 | 715 | 681 | 725 | 705 | 702 | 698 | 704 | 706 | 712 |
|  | Elongation % | 5 | 28 | 14 | 4 | 14 | 6 | 16 | 9 | 12 | 7 | 6 | 15 |
|  | vE 0° C. J | 20 | 19 | 21 | 18 | 22 | 22 | 25 | 21 | 23 | 18 | 17 | 22 |
| Performance of weld joint | crack | Not found | Found | Not found | Not found | Found | Not found | Not found | Found | Not found | Not found | Not found | Not found |
|  | Corrosion resistance | good | good | Not good (low) | good | good | good | good | good | good | good | good | good |
| Welding workability | Arc stability | ○ | ○ | ○ | ○ | ○ | ○ | X | X | ○ | ○ | ○ | ○ |
|  | spatter | ○ | X | ○ | X | ○ | X | X | ○ | ○ | X | ○ | ○ |
|  | Slag coverability | X | ○ | ○ | ○ | ○ | ○ | ○ | ○ | X | ○ | ○ | ○ |
|  | Slag separability | X | ○ | X | ○ | X | ○ | ○ | ○ | X | ○ | ○ | X |
| Overall evaluation |  | X | X | X | X | X | X | X | X | X | X | X | X |
|  |  | Comparison examples | | | | | | | | | | | |

Wire Nos. 0-12 and 25 of Table 4 are examples of the present invention, wire Nos. 13-24 of Table 5 are comparison examples. In wire Nos. 0-12 of the present invention, there are no cracks, corrosion resistance is good, ductility is excellent and welding workability is good, because of appropriate amount of C, Si, Mn, Ni, Cr, F value, amount of $TiO_2$, $SiO_2$, $ZrO_2$, $Al_2O_3$ and total amount of slag agent. In No. 25, though the content of $Al_2O_3$ is low no defect was found because the F value was 40 or more. As a whole, a very satisfying result was obtained.

In the comparison examples, No. 13 shows low elongation because of low Ni content, and also shows poor slag coverability and poor slag separability because of low $TiO_2$ content.

Wire No. 14 shows cracks because of high content of Ni, and shows many spatters because of high content of $TiO_2$.

Wire No. 15 shows low corrosion resistance because of low content of Cr, and shows poor slag separability because of low $SiO_2$ content.

Wire No. 16 shows low elongation because of high content of Cr, and shows many spatters because of high content of $SiO_2$.

Wire No. 17 shows cracks because of low F value and shows poor slag separability because of low content of $ZrO_2$.

Wire No. 18 shows low ductility, i.e., elongation, of weld portion because of high F value and shows many spatters because of high content of $ZrO_2$.

Wire No. 19 shows unstable arc because of low content of C and shows many spatters because of high content of $Al_2O_3$.

Wire No. 20 shows low elongation because of high C content and shows unstable arc and small crack because of low content of $Al_2O_3$. The reason why the crack is small is F value is 30 or more.

Wire No. 21 shows poor slag separability because of low content of Si and shows poor slag coverability because of low total slag amount.

Wire No. 22 shows low elongation because of high content of Si and shows many spatters because of too much total slag amount.

Wire No. 23 shows low elongation because of low content of Mn.

Wire No. 24 shows poor slag separability because of high content of Mn.

The invention claimed is:

1. Stainless steel wire having a flux core for welding zinc-based alloy coated steel sheet comprising:
    an outer metal sheath made of stainless steel coating the flux core;
    wherein the outer metal sheath and the flux core in total comprising in mass (%) as a percentage of the total mass of the wire:
    C: 0.01-0.05%,
    Si: 0.1-1.5%,
    Mn: 0.5-3.0%,
    Ni: 7.0-10.0%, and
    Cr: 26.0-30.0%
        wherein F value defined as expression (1) below ranges from 30 to 50, $$F \text{ value} = 3 \times [Cr\%] + 4.5 \times [Si\%] - 2.8 \times [Ni\%] - 84 \times [C\%] - 1.4 \times [Mn\%] - 19.8 \quad (1)$$

the flux core further comprising a slag formation agent in mass (%) as a percentage of the total mass of the wire:
    $TiO_2$: 0.6-2.6%,
    $SiO_2$: 1.8-3.8%,
    $ZrO_2$: 1.0-3.5%, and
    $Al_2O_3$: 0.1-1.0%,
        wherein said slag formation agent is 10% or less of the total mass of the wire, and
        wherein a balance of the wire is composed of Fe and residual impurities.

2. The stainless steel wire having a flux core for welding zinc-based alloy coated steel sheet according to claim 1, wherein the F value is 40-50.

3. The stainless steel wire having a flux core for welding zinc-based alloy coated steel sheet according to claim 1, wherein the content of Ni is 8.0-10.0%.

4. The stainless steel wire having a flux core for welding zinc-based alloy coated steel sheet according to claim 1, further comprising at least one selected from the group consisting of Mo, Cu, V, Nb, Bi and N.

5. The stainless steel wire having a flux core for welding zinc-based alloy coated steel sheet according to claim 1, wherein the wire comprises N and the content of N is less than 0.05%.

6. The stainless steel wire having a flux core for welding zinc-based alloy coated steel sheet according to claim 1, further comprising a deoxidizing agent which is at least one selected from the group consisting of Al, Mg and Ti.

7. The stainless steel wire having a flux core for welding zinc-based alloy coated steel sheet according to claim 1, wherein the slag formation agent is 5-10% of the total mass of the wire.

8. The stainless steel wire having a flux core for welding zinc-based alloy coated steel sheet according to claim 1, wherein the slag formation agent further comprises at least one selected from the group consisting of potassium silicate, sodium silicate, $Na_2O$, $K_2O$, $CaCO_3$, $BaCO_3$, $AlF_3$, $NaF$, $K_2ZrF_6$, $LiF$, $FeO$ and $Fe_2O_3$.

9. The stainless steel wire having a flux core for welding zinc-based alloy coated steel sheet according to claim 1, wherein the outer metal sheath and the flux core in total comprising in mass (%) as a percentage to the total mass of the wire:
    C: 0.013-0.023%,
    Si: 0.18-1.31%,
    Mn: 0.68-2.58%,
    Ni: 7.22-9.33%, and
    Cr: 26.04-29.66%; and
        wherein said F value is 34 to 47.

* * * * *